(12) United States Patent
Astle

(10) Patent No.: US 6,516,562 B2
(45) Date of Patent: Feb. 11, 2003

(54) IRRIGATION/FERTILIZATION FILTER APPARATUS

(76) Inventor: Joseph C. Astle, 18022 Dog Bar Rd., Grass Valley, CA (US) 95949

( * ) Notice: Subject to any disclaimer, the term of this patent is extended or adjusted under 35 U.S.C. 154(b) by 0 days.

(21) Appl. No.: 09/814,369

(22) Filed: Mar. 21, 2001

(65) Prior Publication Data

US 2002/0134011 A1 Sep. 26, 2002

(51) Int. Cl.[7] ............................................. A01G 29/00
(52) U.S. Cl. ...................................................... 47/48.5
(58) Field of Search ................................ 47/48.5, 40.5, 47/62 R, 62 N

(56) References Cited

U.S. PATENT DOCUMENTS

| | | | |
|---|---|---|---|
| 2,231,300 A | | 2/1941 | Shockney |
| 2,375,860 A | | 5/1945 | Markham |
| 3,026,827 A | | 3/1962 | Cunningham |
| 3,168,224 A | | 2/1965 | Rios |
| 3,478,743 A | * | 11/1969 | Ericson ....................... 285/12 |
| 3,856,205 A | | 12/1974 | Rohling |
| 4,231,188 A | | 11/1980 | McGuire |
| 4,527,353 A | | 7/1985 | Newby |
| 4,606,823 A | * | 8/1986 | Lucas, III .................. 210/282 |
| 4,908,986 A | | 3/1990 | Rowland |
| 4,994,022 A | * | 2/1991 | Steffler et al. ............. 604/317 |
| 5,054,236 A | * | 10/1991 | Sands ......................... 428/11 |
| 5,103,878 A | * | 4/1992 | Cassia ..................... 134/169 A |
| 5,117,582 A | | 6/1992 | Cissel |
| 5,181,951 A | | 1/1993 | Cosse |
| 5,189,835 A | | 3/1993 | Green |
| 5,212,905 A | | 5/1993 | Philoctete |
| 5,252,302 A | * | 10/1993 | Schmidt |
| 5,383,601 A | | 1/1995 | Astle |
| 5,458,567 A | * | 10/1995 | Cathcart ..................... 604/317 |
| 5,705,057 A | * | 1/1998 | Hoffa ......................... 119/260 |
| 5,993,672 A | * | 11/1999 | Manz ......................... 210/744 |
| 6,013,180 A | * | 1/2000 | Wang ......................... 210/232 |

FOREIGN PATENT DOCUMENTS

WO          WO 99/10076      *  3/1999

* cited by examiner

Primary Examiner—Peter M. Poon
Assistant Examiner—Jeffrey L. Gellner
(74) Attorney, Agent, or Firm—Pamela W. Bertani; Weintraub Genshlea Chediak Sproul

(57) ABSTRACT

An irrigation/fertilization filter apparatus for continuously supplying liquid to plants and trees, which comprises a reservoir for containing the liquid having a single exit aperture on its bottom; a cover releasably fitted to the reservoir, which may be adapted with a hose attachment for connection to an external water source; an inlet control for regulating the amount of liquid entering the reservoir; and an outlet control for regulating the rate at which liquid exits the reservoir. The outlet control is situated within the reservoir and consists of a layer of particulate matter, a durable primary filter member, and a porous support, which sits directly on the reservoir's bottom.

11 Claims, 9 Drawing Sheets

IRRIGATION/FERTILIZATION FILTER APPARATUS

BACKGROUND OF THE INVENTION

1. Field Of The Invention

Disclosed is a drip irrigation/fertilization filter apparatus for watering and fertilizing plants and trees with a generally continuous flow of liquid rather than an applied pool of water. The disclosed apparatus comprises a portable stabilized reservoir having an automatic filling system, internal filtration system, and a passive drip delivery means.

The device of the present invention improves upon the related art by preventing internal algae growth on the primary filter element and corresponding clogging due to light entry into the reservoir. The present invention also improves upon the related art by disclosing a novel primary filter element, which is more durable, versatile, and effective than traditional filters. In addition, the present invention improves upon the related art by allowing for use in extremely muddy conditions, and at the same time extending the time period between required filter changes. The present invention also improves upon the related art by permitting a user to employ an easily constructed, relatively inexpensive, and effective way to water plants and trees with a virtually continuous flow of filtered water and fertilizer and at the same time conserve water. Additionally, the present invention improves upon the related art by disclosing a design adapted to sit directly atop soil near plants or trees to be watered, which obviates the need for a support base, spikes, or other means for supporting the reservoir.

2. Description of the Related Art

Various drip irrigation filter devices have been previously developed. These devices lack an effective means for diminishing light entry into the liquid reservoir, and corresponding algae growth and clogging on the primary filter element. Also, known irrigation filter devices are not equipped for use with muddy water, such as that found in irrigation ditches and other agricultural settings, and are designed primarily for use with individually potted plants rather than plants and trees situated directly in the ground.

U.S. Pat. No. 5,383,601 discloses a drip watering apparatus. The apparatus includes a reservoir having a bottom surface with a plurality of apertures, and a base for supporting and stabilizing the reservoir. The reservoir cover can be adapted with a perimeter overhang, which helps shade the reservoir from direct sun exposure. The disclosed apparatus also includes an outlet control system, comprising a support member formed from rigid material and having a plurality of apertures. Spacers are used to elevate the support member above the reservoir bottom. A filter sheet, made from materials such as cloth, paper products, and natural or synthetic polymers, is positioned atop the support member, and a layer of particulate matter rests directly atop the filter. The disclosed liquid inlet control system comprises a float, which is connected to an inlet/cut-off valve via a connecting arm. Liquid, which is added to the reservoir either manually or through a hose attachment, rests above the layer of particulate matter. As the float is forced upward by incoming liquid, the inlet/cut-off valve is adjusted to stop the water flow. As the water level decreases during the irrigation process, the float lowers and activates the inlet/ cut-off valve to allow more liquid into the reservoir.

U.S. Pat. No. 4,527,353 discloses an irrigation/ fertilization control and distribution system. The system includes separate water valve and fertilization mechanisms. The water valve mechanism consists of a water reservoir, which is open to atmospheric pressure and is connected to a sealed water chamber. When the ambient temperature exceeds a predetermined level, air expansion forces water out of the chamber and into the water reservoir, and simultaneously opens a valve allowing pressurized water to flow through a water distribution network and ultimately to plants situated in a connected hydrophonic growth conduit. As atmospheric pressure increases, the valve is closed, and water supply to the distribution network is terminated.

U.S. Pat. No. 5,117,582 discloses a tree irrigator comprising a tree trunk encircling container, which includes an inner water container and an outer support container. The inner water container bottom has a water exit hole, and the outer support container bottom has holes for delivering water to the encircled tree. Between the inner and outer containers are a support pad, spacers, and a wire mesh for aiding in structural support and drainage.

U.S. Pat. No. 5,212,905 discloses a plant watering device comprising a self-contained cylindrical reservoir that surrounds a plant. The device contains an adjustable drip valve means in fluid communication with the reservoir that delivers water or nutrients dropwise to the plant.

U.S. Pat. No. 2,375,860 discloses an irrigation appliance having a combined support and water delivery hollow spike. The spike is inserted into the ground to be watered. Water is held in an upper first container and percolated into a lower second container having fertilizer. The fertilizer solution then exits into the spike and, via apertures in the distal end of the spike, escapes from the device to water the ground near the plant.

U.S. Pat. No. 3,026,827 discloses a plant watering and feeding device having a perforated spike that is inserted into the ground for delivering water. Included is a plant food container and associated valves for selectively extracting the food into the delivered water.

U.S. Pat. No. 3,856,205 discloses a siphon type plant watering device with an attached hollow spike that is inserted into the ground to be watered and controls additional water delivery. When the ground becomes dry, the hollow spike communicates this condition to the apparatus by allowing air to pass into a controlling system that then delivers water to the ground, and subsequently turns water delivery off when the ground is wet, thus blocking air passage into the controlling system.

U.S. Pat. No. 4,231,188 discloses a method and system for propagating plants housed in individual containers. The bottom side of individual plant containers are adapted with porous prongs, which pierce an irrigation tray support containing a sand layer sandwiched between a top and bottom water impermeable plastic opaque sheet. Water from the irrigation tray support passes up through the prongs and into the plant container via capillary action. The disclosed plant container covers holes resulting from each prong, which prevents light entry into the system and corresponding algae growth. The system may employ a conventional filter.

U.S. Pat. No. 3,168,224 is a drip feed device, which is designed to be clipped to the rim of a soil containing pot. Water is delivered from a reservoir container into a tile basin, via an adjustable drip valve. When the tilt basin is filled, it tips and applies water to the soil.

U.S. Pat. No. 4,908,986 discloses a plant fertilizing and watering device for fertilizing and watering individually potted plants. The primary component of this invention is a disk made of synthetic resin or foam, which has a centrally located recess that holds fertilizer and is covered by a porous plug made of the disk material. The disk containing fertilizer is placed in a potted plant's reservoir and covered with water, after which the pot containing the plant is watered periodically. Water and fertilizer pass through the disk's plug via a hole in the bottom of the plant pot by capillary action.

U.S. Pat. No. 5,189,835 discloses a device for continuously irrigating soil of plants growing in individual pots. The device's primary components include a wooden or styrofoam block, which is wrapped in a plastic tape layer having a single sand layer adhesively attached to the tape's inner surface. The block and tape assembly is placed in a shallow container of water, and an individually potted plant is placed atop the block's upper surface in contact with the tape layer, so that the internal sand layer facilitates capillary water flow to and from the potted plant.

U.S. Pat. No. 2,231,300 discloses an irrigating flowerpot made of porous material and a mesh covered bottom, which can be placed within a water containing receptacle or planted directly into the ground. Water and nutrients pass through the flowerpot's porous walls by capillary action to facilitate constant irrigation and fertilization. This device is designed for growing individually potted plants.

U.S. Pat. No. 5,181,951 discloses a gravel/fertilizer packet for potted plants. A water permeable fertilizer packet is placed in the bottom of planting pots to aid in feeding individually potted plants and in preventing soil loss through a pot's drain hole.

U.S. Pat. No. 5,252,302 discloses a liquid fertilizer apparatus utilizing a container that holds a porous sack of nutrients. Water is manually introduced into the container and then allowed to exit slowly through an adjustable valve and onto a plant.

As is apparent from this brief review of related art, known irrigation/filtration devices are not designed to provide an efficient means for continuously hydrating ground based plants and trees, while simultaneously diminishing light entry into the reservoir and corresponding algae growth and clogging on the primary filter element. Moreover, known irrigation/filtration devices do not employ an optimally durable and versatile filter element, and consequently are not equipped for effective use in circumstances involving relatively muddy water, such as in irrigation ditches and similar agricultural settings. Also, known irrigation/filtration devices do not employ a means for promoting plant growth by optimizing fluid delivery to plants while at the same time promoting water conservation. Thus, a need exists for an irrigation/filtration device that: prevents internal algae growth and filter clogging associated with light exposure; dramatically reduces the inconvenience and expense associated with frequent filter changes due to algae growth and clogging; facilitates use in irrigation ditches and other circumstances involving muddy water; promotes irrigation efficiency by optimizing hydration and promoting water conservation; and avoids sizable costs and expenses associated with elaborately designed manual and mechanized irrigation devices.

SUMMARY OF THE INVENTION

Disclosed is a drip irrigation/fertilization filter apparatus for supplying a liquid, usually water or water and a combination of nutrients and fertilizer, to a plant or tree situated directly in the ground. The subject apparatus comprises a reservoir for containing the liquid having a side wall, an upper rim, and a bottom having a single centrally located aperture. The reservoir is made from water insoluble materials such as natural or synthetic polymers and has an optional externally attached handle for easy portability. During use, the reservoir is positioned directly on the ground or soil in close proximity to the tree or plant to be watered.

Provided in the subject apparatus is a liquid outlet control means for regulating an amount of outgoing liquid from the reservoir. The outlet control means comprises a porous support member, a primary filter element, and a bed of particulate matter.

The porous support member sits within the reservoir directly on the reservoir bottom, and is made from a mixture of large grain sand and a binding material such as Portland cement or a resin. In addition to acting as a filter means, the porous support member acts as a ballast by stabilizing and securing the disclosed apparatus in place during use.

Sealed atop the porous support member is a 3-piece circularly shaped primary filter member comprising an outer edge and a top and bottom layer, between which is sealed a nylon coated, decay resistant filter screen. The top and bottom primary filter member layers are made of plastic and contain a plurality of aligned, peripherally located apertures.

The primary filter member bottom layer contains a series of grooved channels, which are directed toward a single aperture located in the center of the bottom layer. The decay resistant filter screen sits directly atop the bottom layer, and the ring shaped top layer is positioned directly atop the decay resistant screen. Silicon, metal pins, or any other suitable attachment means are placed in the aligned, peripherally located plurality of apertures to seal the 3-piece primary filter member unit together. Silicon or any other suitable sealing means is placed around the primary filter member outer edge to seal the primary filter member to the reservoir's inside wall, which facilitates effective liquid flow by directing liquid to pass through the primary filter member and not around its edges.

A layer of loose sand is positioned directly atop the 3-piece primary filter element. Liquid being used for irrigation and fertilization rests directly above the loose sand layer.

Also provided in the subject apparatus is a liquid inlet control means comprising a float, a connecting arm, and an inlet/shut-off valve. The inlet control means is situated inside the reservoir and is attached to the bottom of the reservoir cover. A hose attachment means is secured atop the reservoir cover, and consists of a pipe connected at one end to the inlet/shut-off valve, and connected at the other end to an external hose or other water source. The reservoir cover is releasably fitted to the reservoir upper rim, and can be adapted to incorporate an overhang extending beyond the reservoir side wall to help shade the reservoir from direct sun exposure.

In function, as incoming liquid forces the float upward, the inlet/shut-off valve is adjusted to diminish, and eventually stop, liquid entry into the reservoir. Once in the reservoir, liquid passes first though the loose sand layer, which traps particulate matter and allows the filtered liquid to pass onto the primary filter element and over the decay resistant screen. The decay resistant screen then traps additional particulate matter and allows filtered liquid to enter grooved channels located on the primary filter element bottom layer, which direct liquid to the single centrally located aperture on the primary filter element bottom layer. Liquid exiting the primary filter element bottom layer passes through the porous support element, which further traps particulate matter, and exits the reservoir via the single centrally located aperture on the reservoir's bottom surface.

As the liquid level in the reservoir falls during the irrigation process, the float lowers which activates the inlet/cut-off means to deliver more liquid into the reservoir.

An object of the present invention is to provide a means for drip irrigating and fertilizing plants and trees.

Another object of the present invention is to disclose a drip irrigation/fertilization filter apparatus that includes means for preventing light entry into the liquid reservoir and means for shading the reservoir from direct sun exposure.

Another object of the present invention is to disclose a drip irrigation/fertilization filter apparatus designed to prevent clogging associated with algae growth on the primary filter element.

Another object of the present invention is to disclose a drip irrigation/fertilization filter apparatus employing a durable and versatile filter element, which optimizes filtration and does not require frequent changing.

Another object of the present invention is to disclose a drip irrigation/fertilization filter apparatus capable of filtering muddy water, such as that associated with irrigation ditches, without compromising the integrity or functionality of the apparatus, and without requiring frequent filter changes.

Another object of the present invention is to provide a drip irrigation/fertilization filter apparatus having a means for leveling and stabilizing the apparatus directly on the ground proximate a plant or tree to be watered, thus obviating the need for a separate reservoir support base.

Another object of the present invention is to supply, for increased growth, a means for conserving water and simultaneously suppling continuous hydration to plants and trees.

Another object of the present invention is to disclose a drip irrigation/fertilization filter apparatus that has an adjustable outlet flow of liquid.

Another object of the present invention is to furnish a drip irrigation/fertilization filter apparatus having an easily portable reservoir, an adjustable inlet and outlet flow, and a means for including fertilizer during irrigation.

Another object of the present invention is to disclose a drip irrigation/fertilization filter apparatus that is inexpensive and reliable for delivering a continuous flow of liquid to plants and trees.

Other objects, advantages, and novel features of the present invention will become apparent from the detailed description that follows, when considered in conjunction with the associated drawings.

DESCRIPTION OF THE PREFERRED EMBODIMENT

Figure 1:
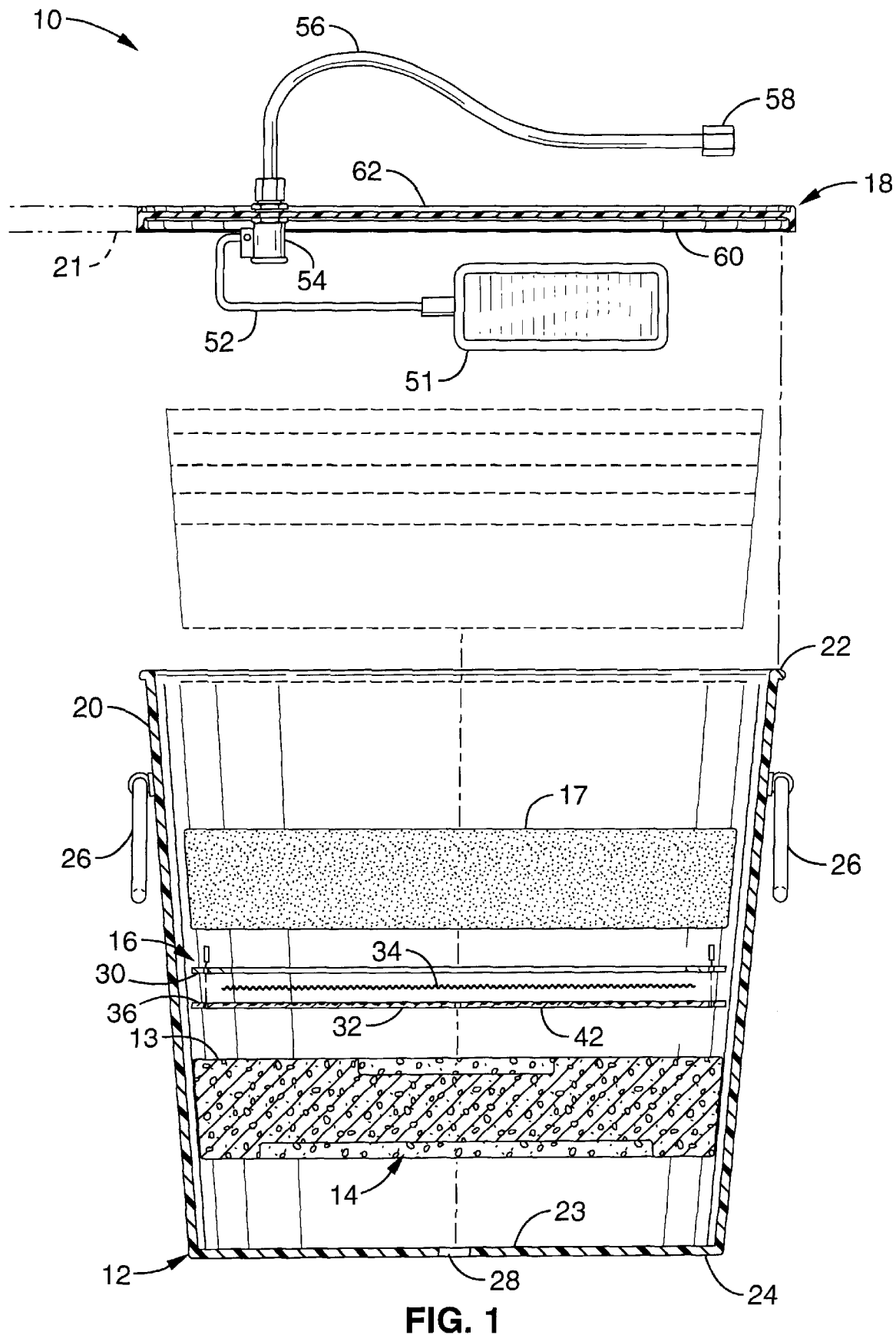
FIG. 1 is a cross sectional partially exploded view of the disclosed device.

Referring now specifically to the drawings, FIG. 1 shows the inventive drip irrigation/fertilization filter, which is generally designated herein with the reference numeral 10. Irrigation filter 10 is comprised of a reservoir 12, a liquid outlet control means, and a liquid inlet control means.

As shown in FIG. 1, reservoir 12 comprises a side wall 20 that is generally continuous and often a slightly tapered cylinder, although other configurations, shapes and sizes of reservoir 12 are contemplated to be within the realm of this disclosure. The side wall terminates in an upper rim 22 and a bottom 24. For portability, an optional handle 26 is often included, which is connected to the outside of side wall 20 by standard means.

Formed into the reservoir's bottom 24 is a single aperture 28, the diameter of which is variable and selected to accommodate the particular reservoir volume and desired delivery rate. The diameter of aperture 28 is often between about one-half inch to one-eighth inch, but may be smaller or larger if needed. The aperture may be directly formed in reservoir bottom 24 during fabrication or later by drilling, punching, melting, and equivalent methods. Although not mandatory, preferably reservoir 12 is formed as a single unit with rim 22, bottom 24, and side wall 20 connected into a seamless piece. Reservoir 12 is fabricated from water insoluble material such as natural or synthetic polymers, and non-corrosive metals and metal alloys. Traditionally shaped buckets, inexpensive or discarded plastic pails, or more aesthetically pleasing containers are all suitable for serving as a reservoir for the present invention.

Figure 2:
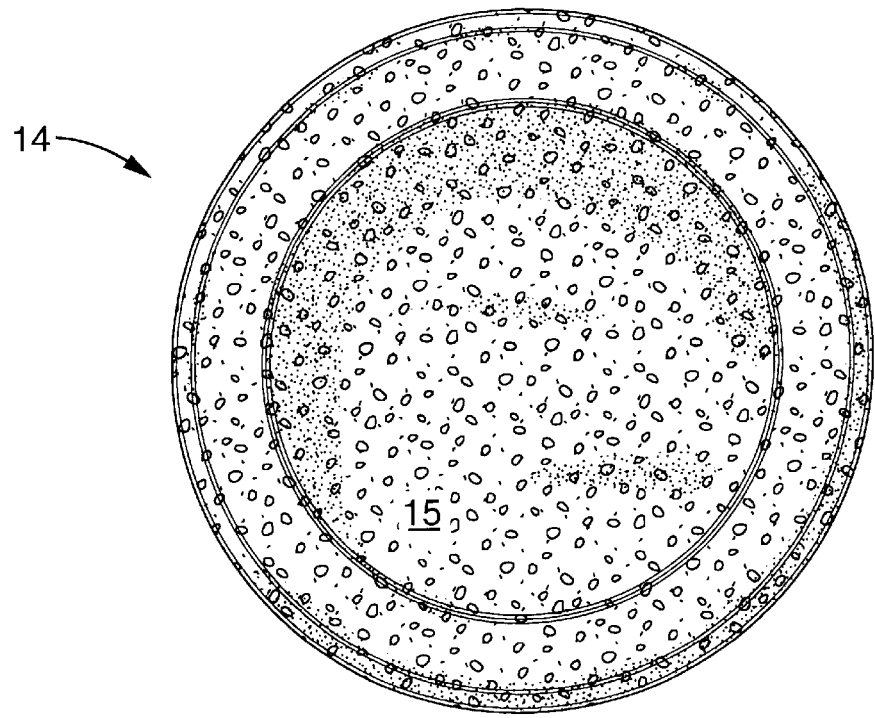
FIG. 2 is a bottom view of the porous ballast support member.
Figure 3:
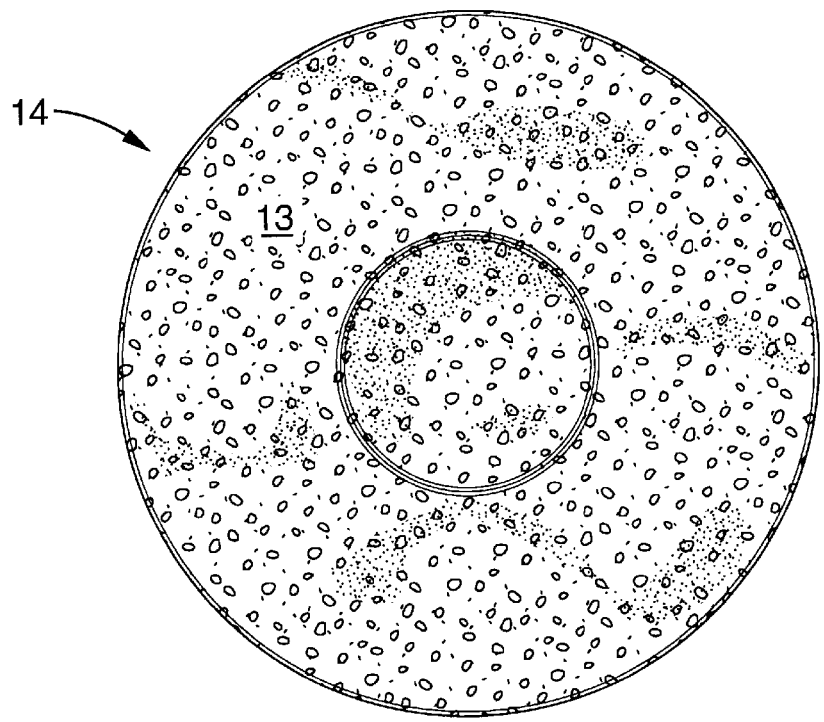
FIG. 3 is a top view of the porous ballast support member.

The liquid outlet means comprises a porous support member 14, a 3-piece primary filter member 16, and layer of particulate matter 17. As shown in FIGS. 2 and 3, porous support member 14 has a top surface 13, a bottom surface 15, a perimeter edge, and is generally planar in shape, although other shapes, such as concave and convex, are contemplated. Typically, porous support member 14 is approximately 21 to 22 inches in diameter, and approximately 1¼ inches thick, although different sizes are contemplated depending upon the size of reservoir 12. As shown in FIGS. 1, 2, and 3, porous support member top surface 13 has a centrally located recess, which is approximately 3 inches in diameter and ⅟16 inch deep. Porous support member bottom surface 15 has a centrally located recess, which is approximately 6 inches in diameter and one-half inch in depth. Porous support member 14 is sized to fit within reservoir 12, proximate reservoir bottom 24, and is positioned within reservoir 12 directly on top surface 23 of reservoir bottom 24. Porous support member 14 is typically made from a mixture of #6 large grain sand and a binding material such as Portland cement or a resin.

Figure 4:
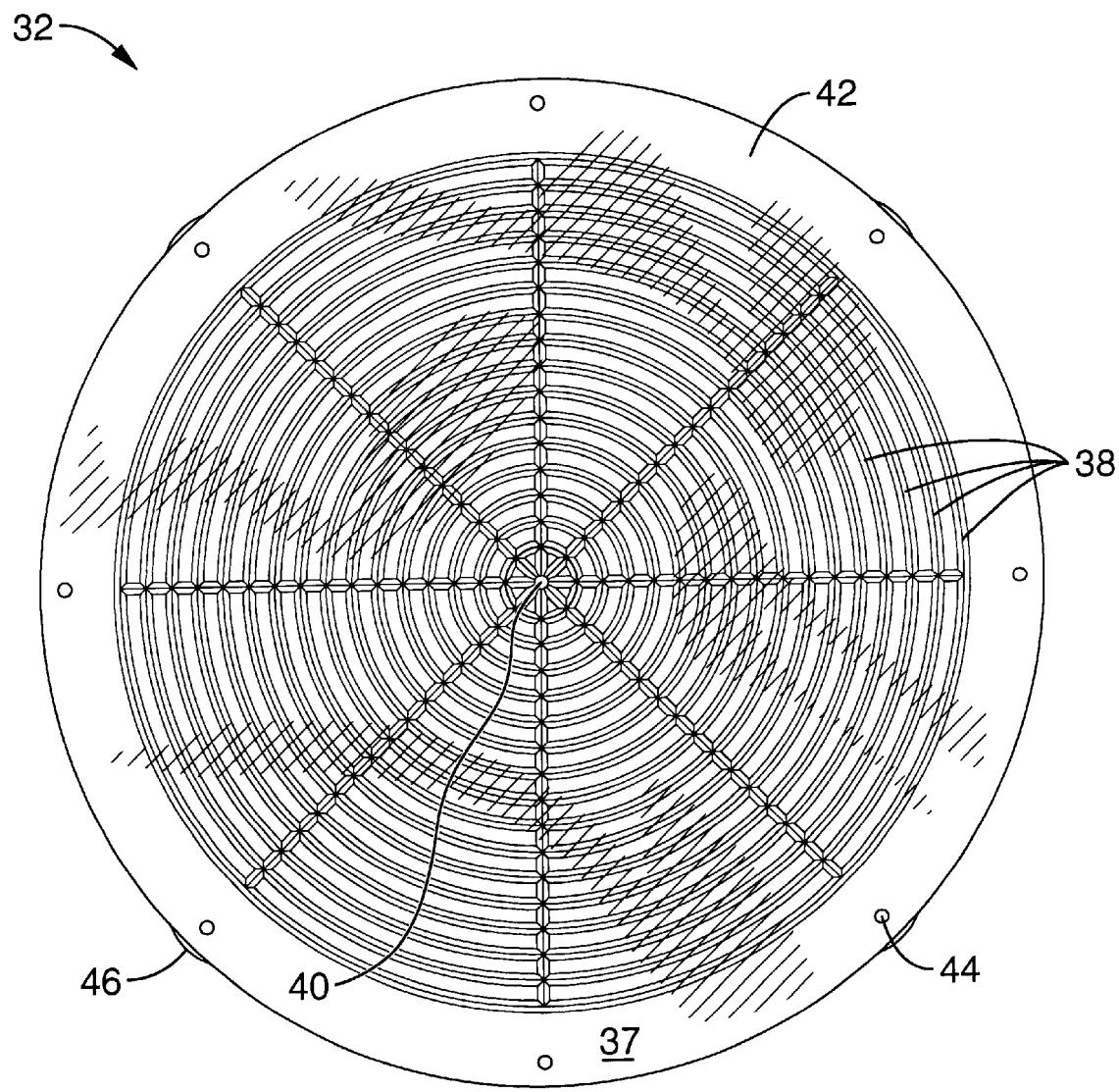
FIG. 4 is a bottom view of the primary filter member bottom portion.
Figure 5:
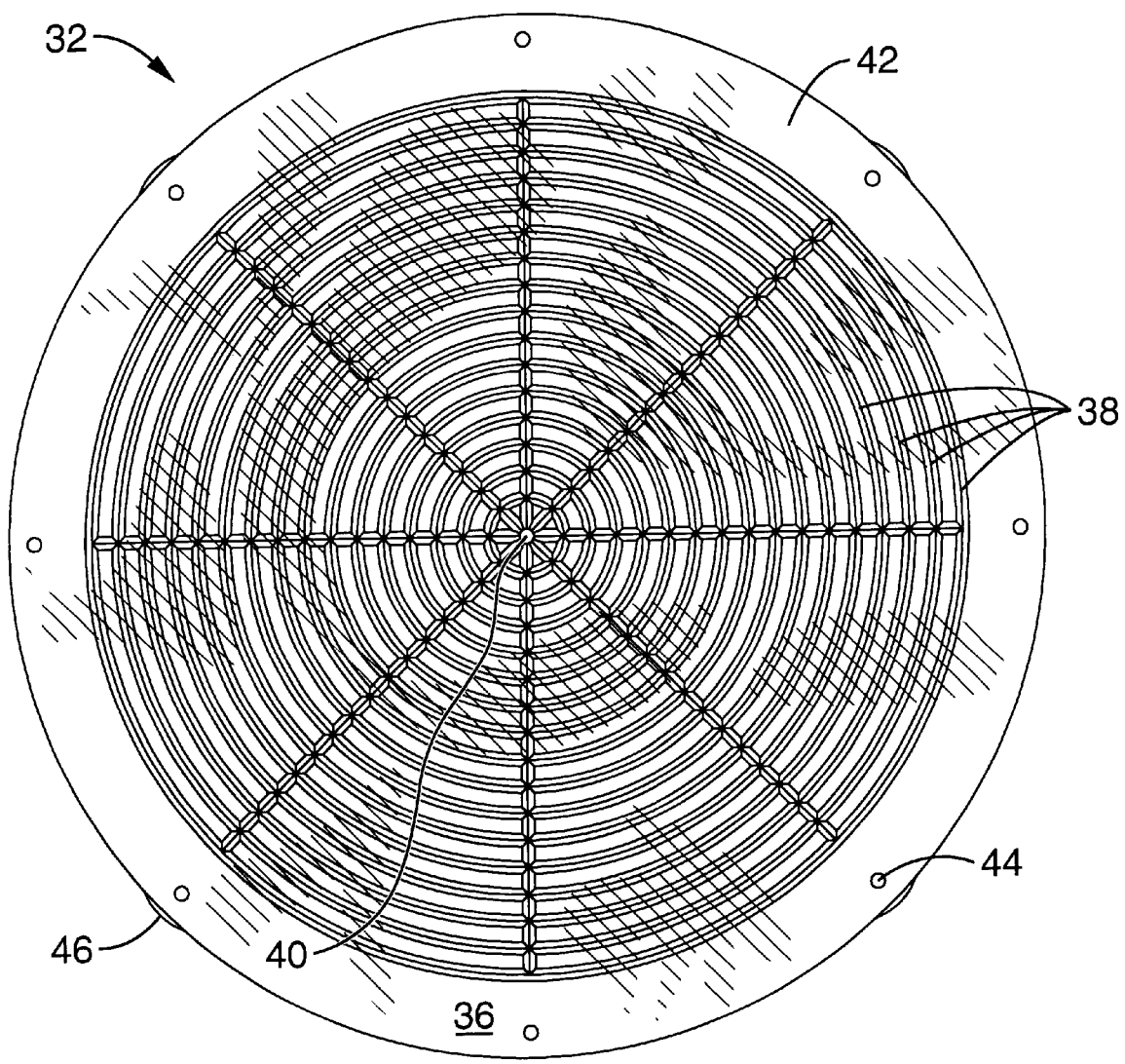
FIG. 5 is a top view of the primary filter member bottom portion.
Figure 6:
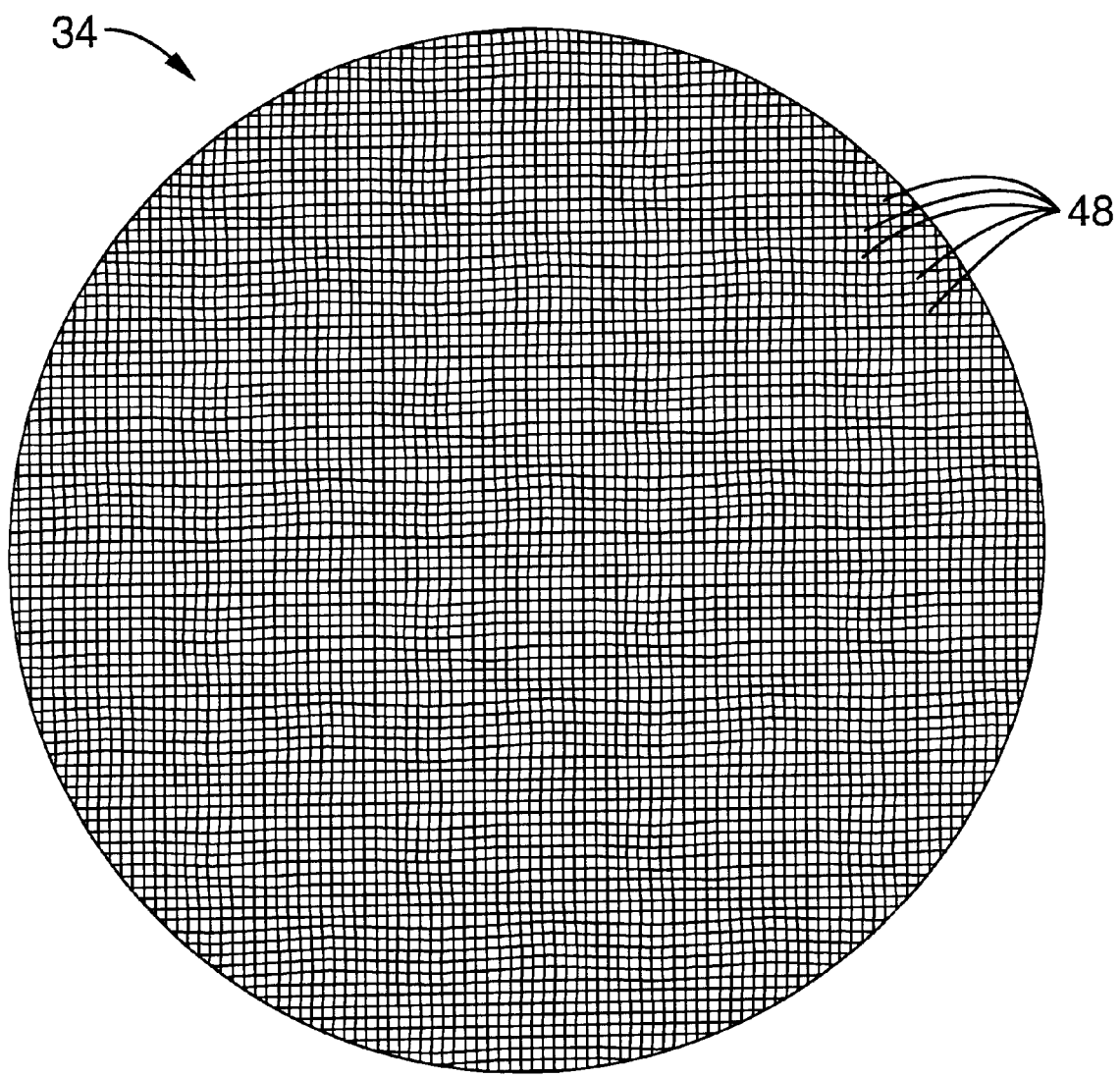
FIG. 6 is a top view of the filter screen.
Figure 7:
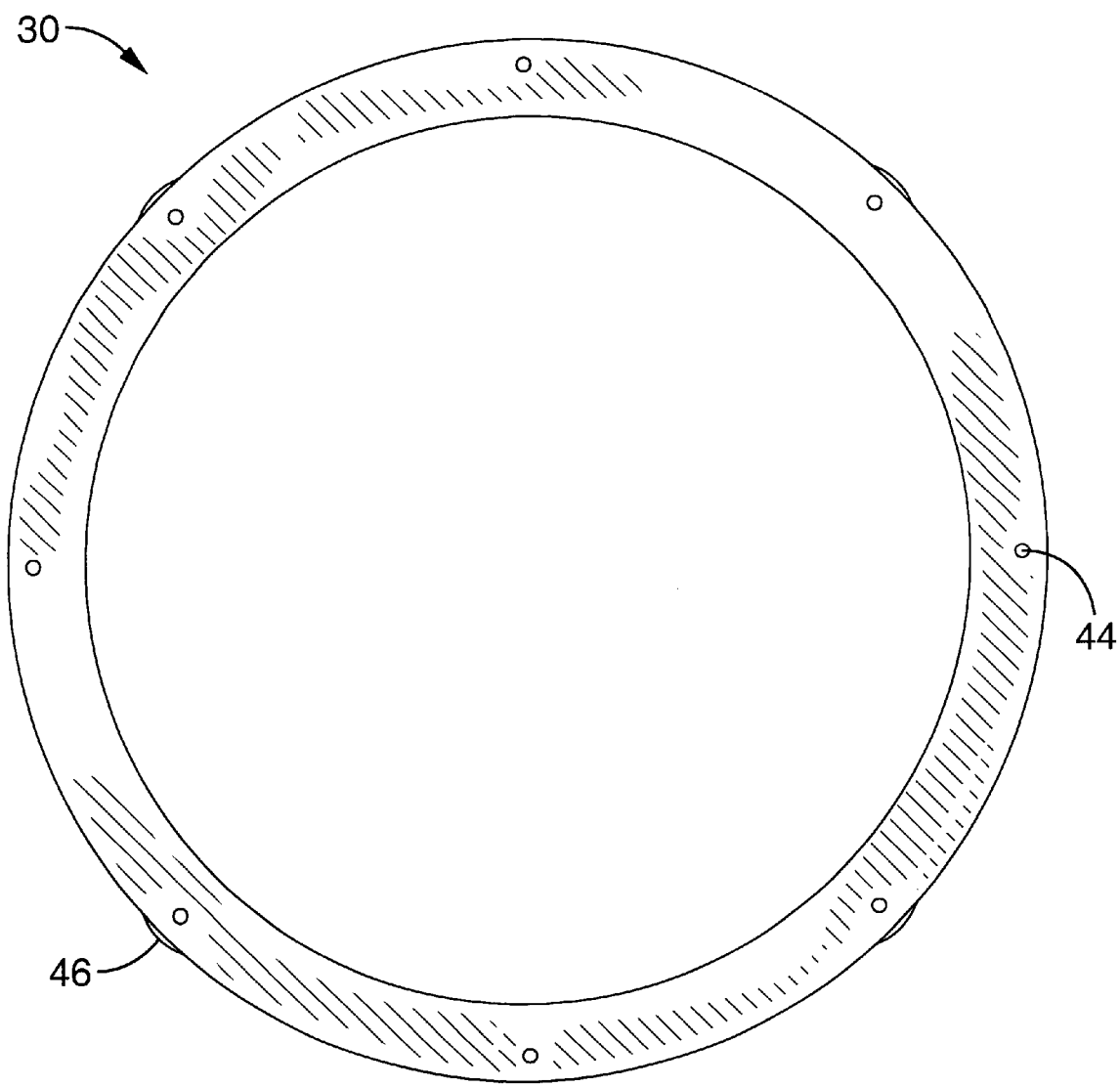
FIG. 7 is a top view of the primary filter member top portion.
Figure 8:
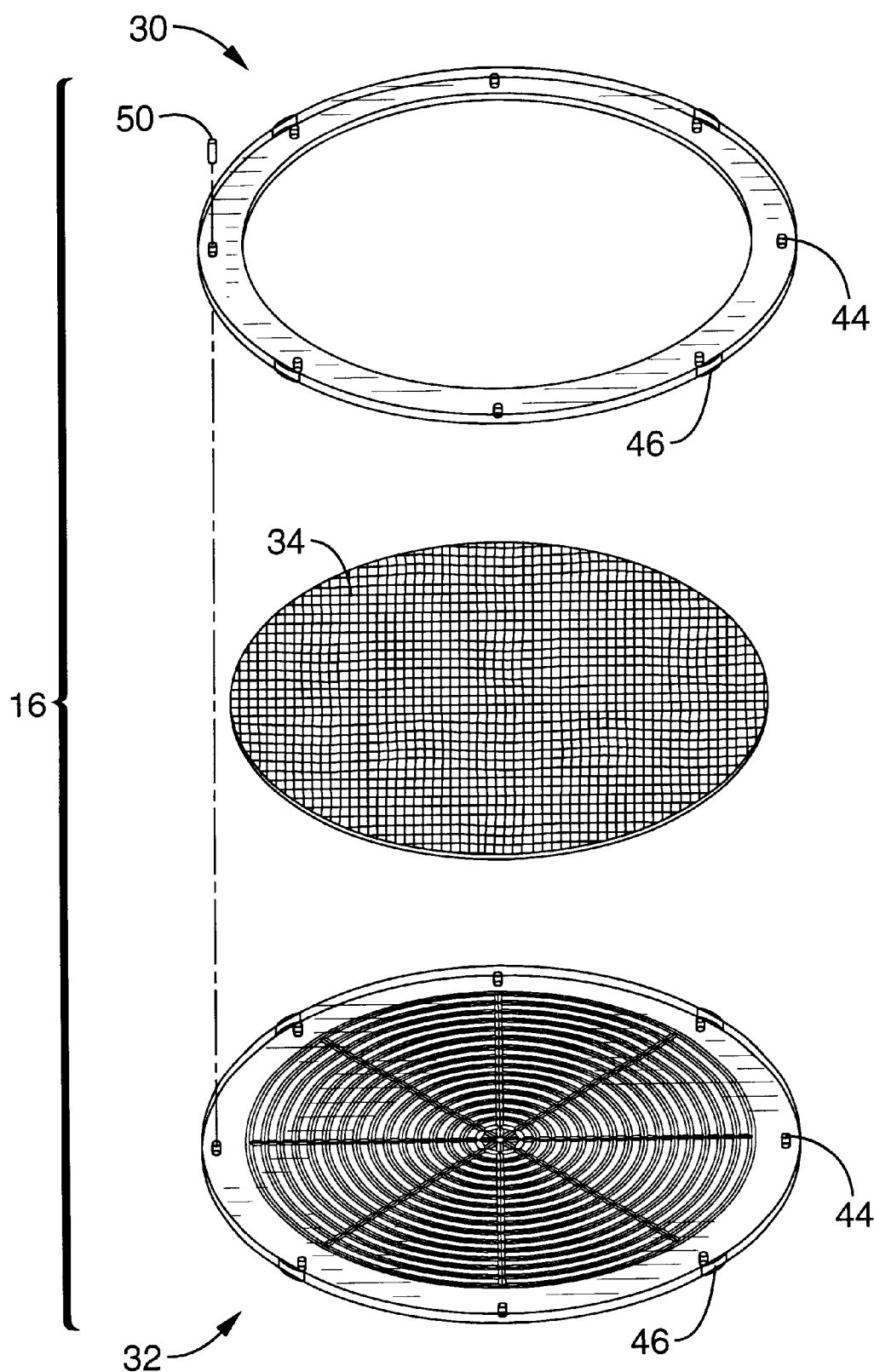
FIG. 8 is an exploded perspective view showing the 3-piece primary filter member assembly of the present invention.
Figure 11:
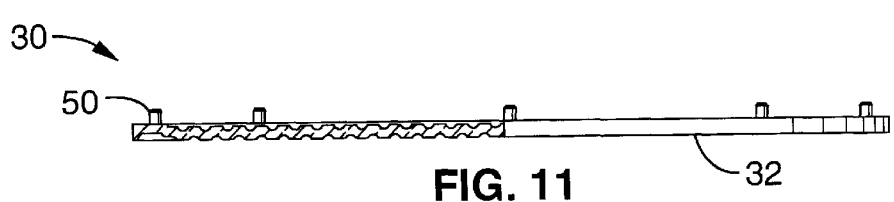
FIG. 11 is a side view of the primary filter member with a portion shown in cutaway.
Figure 12:
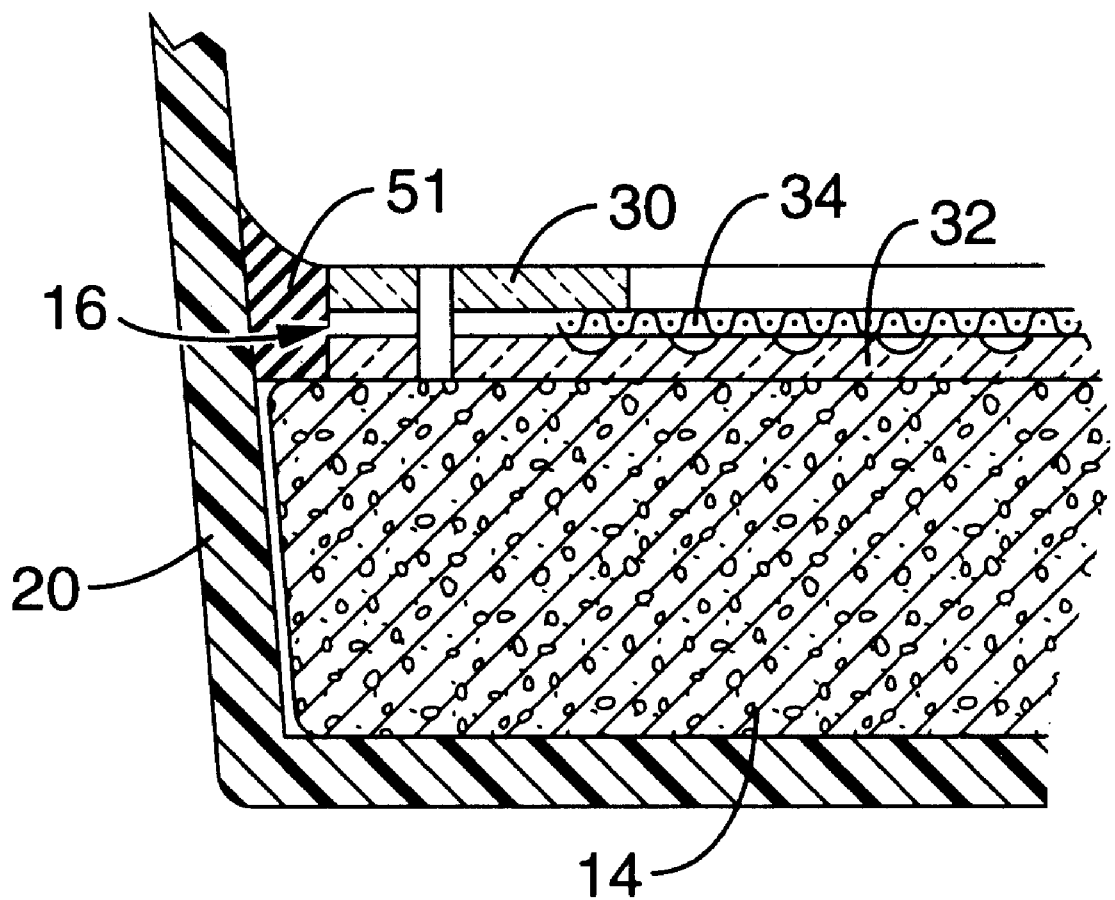
FIG. 12 is a cross sectional view of the disclosed device.

Primary filter member 16 comprises a top portion 30, a bottom portion 32, and a filter screen 34. As shown in FIGS. 4 and 5, bottom surface 42 and top surface 36 of bottom portion 32 contain a plurality of grooved channels 38, which are directed toward a single aperture 40 located in the center of bottom portion 32. As shown in FIGS. 4, 5, 7 and 8, bottom portion 32 and top portion 30 contain a plurality of aligned, hexagonally shaped, peripherally located apertures 44, and peripherally located spacers 46. As shown in FIGS. 6 and 8, filter screen 34 contains a plurality of apertures 48. Apertures 40 and 44 are approximately ¼ inch in diameter, although different sizes are anticipated depending upon constructions preferences. As shown in FIG. 1, bottom surface 42 of bottom portion 32 sits directly atop porous support member top surface 13. Filter screen 34 sits directly atop top surface 36 of bottom portion 32. Top portion 30 sits directly atop filter screen 34. As shown in FIGS. 8, 11, and 12 the 3-piece assembly, comprising bottom portion 32, filter screen 34, and top portion 30, is sealed into one unit by inserting attachment means 50 into aligned, hexagonally shaped, peripherally located plurality of apertures 44 and snapping the 3-piece primary filter member unit together. Silicone or some other suitable sealant 51 is placed around the outer edge of primary filter member 16 to attach primary filter member 16 to the inside of reservoir side wall 20. Bottom portion 32 and top portion 30 are made of plastic, and filter screen 34 is made of a nylon-coated, decay-resistant synthetic or natural polymer material. The thickness of filter screen 34 and the type of material from which filter screen 34 is fabricated are selected to permit a desired liquid flow rate.

As shown in FIG. 1, layer of particulate matter 17 sits directly atop primary filter member 16. Typically, layer 17 is comprised of loose #8 sand, gravel, and the like, which are selected for their ability to pass a desired amount of liquid in a given period of time. Particle size within particulate matter 17 and interactive characteristics between the particles within the particulate matter determines the liquid flow rate. The size of the particles comprising the particulate matter are selected to have a size too large to pass through underlying primary filter member 16. Generally, for any one type of particulate matter 17, the thicker the layer of particulate matter 17, the slower the passage of liquid. Depending upon the desired liquid flow rate, the thickness of layer 17 is varied. Layer 17 must have a compositional structure that permits the flow of liquid but prevents the passage of particulate matter 17.

Figure 9:
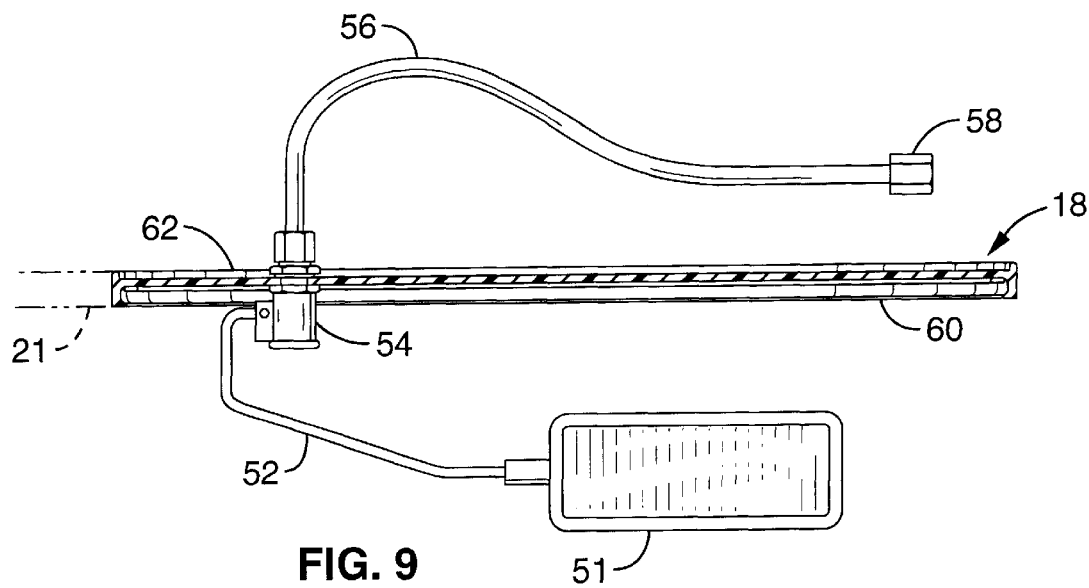
FIG. 9 is a cross sectional view of the cover of the present invention.

As shown in FIG. 9, the preferred embodiment of the liquid inlet control means comprises float 51, connecting arm 52, and inlet/shut-off valve 54. Cover 18 comprises bottom surface 60 and top surface 62. Attached to bottom surface 60 and extending through top surface 62 is valve 54. One end of connecting arm 52 engages valve 54, while the opposite end of connecting arm 52 is attached to float 51. Optionally attached to top surface 62 is pipe attachment 56, which can be connected at one end to valve 54 and terminate in hose fitting 58. Hose fitting 58 may be connected to an external liquid source. Alternatively, liquid may be added to reservoir 12, manually. Cover 18 may also be adapted to include a perimeter overhang 21 extending beyond reservoir side wall 20 to help shade reservoir 12 and its contents from direct sun exposure. Cover 18 and float 51 are made of plastic. Connecting arm 52, pipe attachment 56, and hose fitting 58 are made of rust resistant metals or metal alloys.

Figure 10:
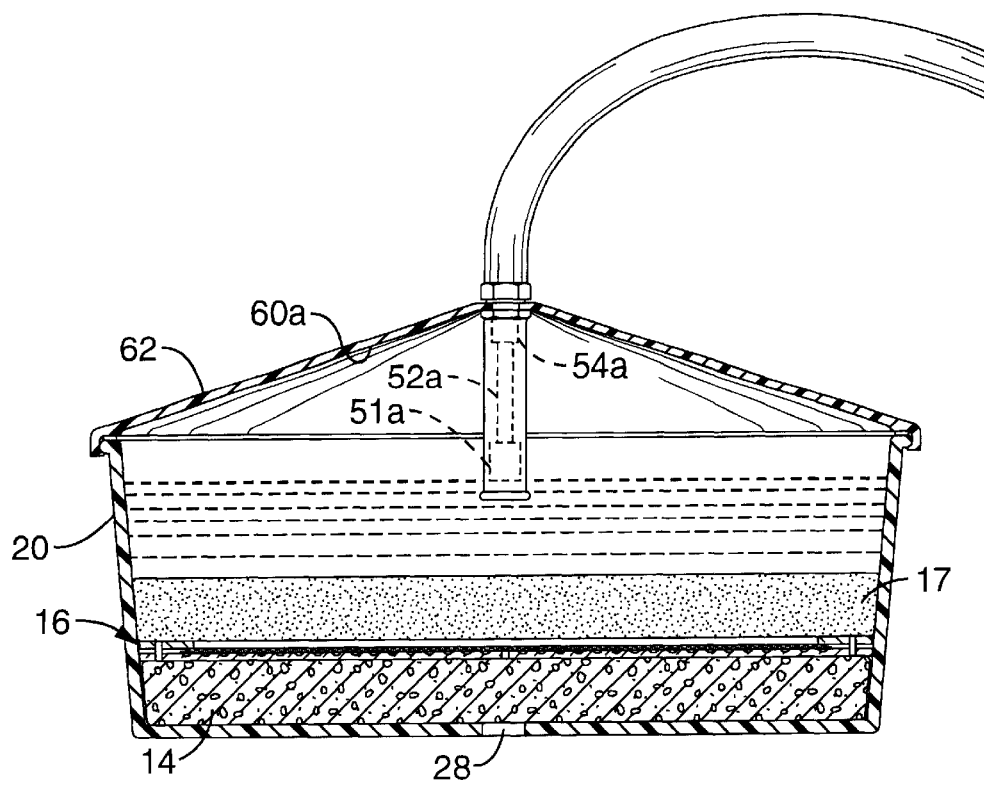
FIG. 10 is a cross sectional view of an alternative embodiment of the cover of the present invention.

As shown in FIG. 10, an additional embodiment of the inlet control means comprises float 51a, connecting stem 52a, and inlet/shut-off value 54a. Cover 18a comprises outer surface 62a and inner surface 60a. Outer surface 62a is cone shaped and terminates in peak 64. Attached at peak 64 is inlet/shut-off valve 54a. One end of connecting stem 52a engages inlet/shut-off valve 54a, while the opposite end of connecting stem 52a is attached to float 51a. A standard garden hose or other external water source may be attached to inlet/shut-off valve 54a at peak 64.

In function, the subject device is often used in tree orchards, or similar agricultural environments, which require the watering and fertilization of multiple trees or plants. However, the alternative embodiment of the inlet control means, along with a smaller reservoir, may be more aesthetically pleasing and suitable for use with home gardens, commercial and public landscapes, and other non-agricultural settings.

Generally, an individual device is placed directly on the soil near the base of each tree or plant, and in any available shade. Although water may be added to each device manually, usually in practice each device is directly connected to a water hose or pipe, which is equipped with a timer or an equivalent means for regulating the periods in which water is supplied to the hose. During periods in which water is supplied to the hose, the reservoir fills to the cut-off level and is maintained at that level via the inlet/shut-off valve. About a 45 minute filling cycle is common, but other time intervals are acceptable and depend on various factors, including plant type, soil type, and reservoir volume. The liquid within the reservoir percolates down through the particulate layer, through the primary filter member and support member, and out of the single aperture on the reservoir bottom. To increase or decrease liquid delivery, the type or thickness of filter screen and particulate matter can be adjusted. Fertilizer and other nutrients may be placed either directly within the reservoir or, more commonly, directly beneath the reservoir. The stream of exiting drips slowly dissolves the nutrients for transportation into the soil and plant or tree roots.

Several advantages result from the disclosed device. Most significantly, algae is less likely to grow on the decay resistant screen because employing layers of particulate matter both above and below the primary filter member prevents light from penetrating the primary filter member. Moreover, the porous support member sits directly on the reservoir's bottom, as opposed to being elevated by spacers, which further impedes light entry into the reservoir. In addition, the reservoir's bottom contains only one exit aperture, instead of a plurality of exit apertures, thus diminishing the number of potential light entry points. Also, the reservoir cover may be adapted with a perimeter overhang, which assists in preventing light entry into the reservoir.

The primary filter member is more durable than conventional filters, and is better equipped for use in a variety of agricultural and commercial growing settings, including muddy irrigation ditches. Using the decay resistant filter screen instead of conventional paper or cloth filters enables the device to filter very muddy water for long time periods between filter cleanings and changes. Sealing the primary filter member to the reservoir's inside wall prevents unfiltered liquid from leaking through the device onto soil.

The present invention also promotes water conservation while effectively hydrating tree and plant roots by dripping liquid, which may be regulated to achieve varying volume delivery rates, one droplet at a time, through the reservoir's one centrally located aperture, which subsequently fans out and hydrates all roots efficiently. This hydration method avoids water waste associated with evaporation and the inadvertent watering of weeds and nearby objects that do not require watering. And finally, the heavy porous support member acts not only as a filter, but also as a ballast by stabilizing the reservoir and its contents, which obviates the need for a stand or other apparatus to hold the reservoir in place during use. Also, given the disclosed configuration of the subject invention, it is easily transported and disassembled for cleaning, and is relatively inexpensive in construction.

The foregoing detailed disclosure of the inventive irrigation/fertilization filter apparatus 10 is only illustrative of the preferred embodiment of the invention, and is not a limitation upon the invention's scope. Those skilled in the art will envision many other possible variations of the structure disclosed herein, which nonetheless fall within the scope of the following claims. For example, reservoir 12 and its contents may be larger or smaller to accommodate different liquid volumes, and constructed in different shapes and sizes depending upon placement requirements. Consequently, the scope of the present invention should be determined with reference to the appended claims, and not by the examples that have been given herein.

I claim:

1. An irrigation/fertilization filter apparatus for supplying a liquid to a plant, comprising:
   a. a reservoir for containing the liquid having a side wall, an upper rim, and a bottom having an aperture;
   b. an outlet control means for regulating an amount of outgoing liquid from said reservoir, wherein said outlet control means comprises:
      (i) a support member, said support member having an upper surface;
      (ii) a primary filter member having an upper and lower portion, a filter screen positioned between said upper and lower portions, and a perimeter edge, wherein said primary filter member lower portion is positioned immediately atop said support member upper surface; and
      (iii) a bed of particulate matter;
   c. an inlet control means for admitting and regulating an amount of liquid into said reservoir; and
   d. a cover releasably fitted to said reservoir upper rim.

2. The apparatus of claim 1, further comprising a seal attaching said primary filter member to said reservoir side wall.

3. An irrigation/fertilization filter apparatus for supplying a liquid to a plant, comprising:
   a. a reservoir for containing the liquid having a side wall, an upper rim, and a bottom having an aperture;
   b. an outlet control means for regulating an amount of outgoing liquid from said reservoir, wherein said outlet control means comprises:
      (i) a support member with upper and lower surfaces having a plurality of apertures extending between and through said upper and lower surfaces, wherein said support member fits within said reservoir proximate said reservoir bottom;
      (ii) a primary filter member with an upper and lower portion, a filter screen positioned between said upper and lower portions, and a perimeter edge, wherein said primary filter member is positioned immediately atop said support member upper surface;
      (iii) a bed of particulate matter layered immediately above and on said control plate upper portion and said filter screen, wherein said particulate matter is too large in size to pass through said filter screen; and
      (iv) a seal attaching said primary filter member perimeter edge to said reservoir side wall to inhibit said particulate matter from passing said support member towards said reservoir bottom;
   c. an inlet control means for admitting and regulating an amount of liquid into said reservoir; and
   d. a cover adapted to incorporate an overhang extending beyond said reservoir side wall to help shade the reservoir from direct sun exposure, wherein said cover is releasably fitted to said reservoir upper rim.

4. The apparatus of claim 3 wherein said primary filter member upper portion contains a plurality of peripherally located apertures.

5. The apparatus of claim 3 wherein said primary filter member lower portion contains a plurality of peripherally located apertures which are aligned with said plurality of peripherally located apertures of said upper primary filter member portion.

6. The apparatus of claim 3 wherein said primary filter member lower portion contains a series of grooved channels directed toward a centrally located aperture.

7. The apparatus of claim 3 further comprising a means for connecting said primary filter member upper portion, said filter screen, and said primary filter member lower portion through said plurality of peripherally located apertures of said primary filter member upper and lower portions.

8. An apparatus for supplying a liquid to a plant, comprising:
   a. a reservoir for containing the liquid having a side wall, an upper rim, and a bottom having an aperture;
   b. an outlet control means for regulating an amount of outgoing liquid from said reservoir, wherein said outlet control means comprises:
      (i) a support member with upper and lower surfaces having a plurality of apertures extending between and through said upper and lower surfaces, wherein said support member fits within said reservoir proximate said reservoir bottom;
      (ii) a primary filter member with an upper and lower portion, a filter screen positioned between said upper and lower portions, and a perimeter edge, wherein said primary filter member lower portion is positioned immediately above and on said support member upper surface; and
      (iii) a bed of particulate matter layered immediately above and on said primary filter member upper portion, wherein said particulate matter is too large in size to pass through said filter screen;
   c. a cover releasably fitted to said reservoir upper rim;
   d. a hose attachment means secured to said cover for attaching a hose for supplying incoming liquid to said reservoir; and
   e. an inlet control means associated with said hose attachment means for regulating an amount of incoming liquid into said reservoir.

9. An irrigation/fertilization filter apparatus for supplying a liquid to a plant, comprising:
   a. a reservoir for containing the liquid having a side wall, an upper rim, and a bottom having an aperture;
   b. an outlet control means for regulating an amount of outgoing liquid from said reservoir, wherein said outlet control means comprises:
      (i) a support member with upper and lower surfaces having a plurality of apertures extending between and through said upper and lower surfaces, wherein said support member fits within said reservoir proximate said reservoir bottom;
      (ii) a primary filter member with an upper and lower portion, a filter screen positioned between said upper and lower portions, and a perimeter edge, wherein said lower portion is positioned immediately above and on said support member upper surface; and
      (iii) a bed of particulate matter layered immediately above and on said primary filter member upper portion and said filter screen, wherein said particulate matter is too large in size to pass through said filter screen; and (v) a seal attaching said primary filter member perimeter edge to said reservoir side wall.

c. a cover releasably fitted to said reservoir upper rim;

d. a hose attachment means secured to said cover for attaching a hose for supplying incoming liquid to said reservoir; and e. an inlet control means associated with said hose attachment means for admitting and regulating an amount of liquid into said reservoir.

10. An irrigation/fertilization filter apparatus for supplying a liquid to a plant, comprising:

a. a reservoir for containing the liquid having a side wall, an upper rim, and a bottom having an aperture;

b. an outlet control means for regulating an amount of outgoing liquid from said reservoir, wherein said outlet control means comprises:

(i) a support member with upper and lower surfaces having a plurality of apertures extending between and through said upper and lower surfaces, wherein said support member fits within said reservoir proximate said reservoir bottom;

(ii) a primary filter element with an upper and lower portion, a filter screen positioned between said upper and lower portions, and a perimeter edge, and wherein said primary filter member lower portion is positioned immediately above and on said support member upper surface;

(iii) a bed of particulate matter layered immediately above and on said primary filter member upper portion, wherein said particulate matter is too large in size to pass through said filter screen; and (iv) a seal attaching said primary filter member perimeter edge to said reservoir side wall to inhibit said particulate matter from passing said support member towards said reservoir bottom;

c. a cover adapted to incorporate an overhang extending beyond said reservoir side wall to help shade said reservoir from direct sun exposure, wherein said cover is releasably fitted to said reservoir upper rim.

d. a hose attachment means secured to said cover for attaching a hose for supplying incoming liquid into said reservoir; and e. an inlet control means associated with said hose attachment means for admitting and regulating an amount of liquid into said reservoir.

11. An irrigation/fertilization filter apparatus for supplying a liquid to a plant, comprising:

a. a reservoir for containing the liquid having a side wall, an upper rim, and a bottom having an aperture;

b. an outlet control means for regulating an amount of outgoing liquid from said reservoir, wherein said outlet control means comprises:

(i) a support member with upper and lower surfaces having a plurality of apertures extending between and through said upper and lower surfaces, wherein said support member fits within said reservoir proximate said reservoir bottom;

(ii) a primary filter member with an upper and lower portion, a filter screen positioned between said upper and lower portions, and a perimeter edge, wherein said upper portion contains a plurality of peripherally located apertures, and wherein said lower portion contains a series of grooved channels directed toward a centrally located aperture and a plurality of peripherally located apertures aligned with said upper portion peripherally located apertures, and wherein said lower portion is positioned immediately above said support member upper surface;

(iii) a means for connecting said primary filter member upper portion, said filter screen, and said primary filter member lower portion through said peripherally located apertures of said primary filter member upper and lower portions;

(iv) a bed of particulate matter layered immediately above and on said primary filter member upper portion, wherein said particulate matter is too large in size to pass through said filter screen; and (v) a seal attaching said primary filter member perimeter edge to said reservoir side wall to inhibit said particulate matter from passing said support member towards said reservoir bottom;

c. a cover releasably fitted to said reservoir upper rim;

d. a hose attachment means secured to said cover for attaching a hose for supplying incoming liquid to said reservoir; and e. an inlet control means associated with said hose attachment means for admitting and regulating an amount of liquid into said reservoir.

* * * * *